United States Patent
Yamamoto

(10) Patent No.: US 11,516,376 B2
(45) Date of Patent: *Nov. 29, 2022

(54) MEDICAL IMAGE ACQUISITION SYSTEM AND MEDICAL IMAGING DEVICE

(71) Applicant: Sony Olympus Medical Solutions Inc., Tokyo (JP)

(72) Inventor: Takahiro Yamamoto, Tokyo (JP)

(73) Assignee: SONY OLYMPUS MEDICAL SOLUTIONS INC., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/351,241

(22) Filed: Jun. 18, 2021

(65) Prior Publication Data

US 2021/0314482 A1    Oct. 7, 2021

Related U.S. Application Data

(63) Continuation of application No. 16/583,262, filed on Sep. 26, 2019, now Pat. No. 11,102,391, which is a (Continued)

(30) Foreign Application Priority Data

Jun. 12, 2015  (JP) .............................. JP2015-119731

(51) Int. Cl.
*H04N 5/232*  (2006.01)
*H04N 5/225*  (2006.01)

(52) U.S. Cl.
CPC ....... *H04N 5/23212* (2013.01); *H04N 5/2254* (2013.01); *H04N 5/23209* (2013.01); *H04N 2005/2255* (2013.01)

(58) Field of Classification Search
CPC ............. H04N 5/23212; H04N 5/2254; H04N 5/23209; H04N 2005/2255

(Continued)

(56) References Cited

U.S. PATENT DOCUMENTS

2003/0025789 A1    2/2003  Saito et al.
2003/0040659 A1*   2/2003  Kazakevich ....... G02B 23/2407
                                                          600/103

(Continued)

FOREIGN PATENT DOCUMENTS

JP        2-304413 A    12/1990
JP     2002-369796 A    12/2002

(Continued)

OTHER PUBLICATIONS

Office Action dated Feb. 5, 2019 for corresponding Japanese Patent Application No. 2015-119731, 10 pages.

(Continued)

*Primary Examiner* — Lin Ye
*Assistant Examiner* — Chan T Nguyen
(74) *Attorney, Agent, or Firm* — Xsensus LLP

(57) ABSTRACT

A medical image acquisition system includes an imaging device and an image processing device. The imaging device includes: an imaging unit configured to receive light and convert the light into an electric signal so as to generate the imaging signal; an optical unit including a focus mechanism moving one or a plurality of lenses so as to adjust a focal point position, and configured to form an optical image on the imaging unit; a memory configured to store therein unique information of the imaging device; and an auto focus controller configured to totally control the imaging device. The image processing device includes an auto focus evaluation unit configured to perform focusing evaluation based on the imaging signal, and the auto focus controller controls driving of the focus mechanism by referring to the unique information in accordance with an evaluation result by the auto focus evaluation unit.

11 Claims, 10 Drawing Sheets

Related U.S. Application Data continuation of application No. 16/231,009, filed on Dec. 21, 2018, now Pat. No. 10,484,594, which is a continuation of application No. 15/155,197, filed on May 16, 2016, now abandoned.

(58) Field of Classification Search
USPC .......................................................... 348/349
See application file for complete search history.

(56) References Cited

U.S. PATENT DOCUMENTS

| | | |
|---|---|---|
| 2003/0060681 A1 | 3/2003 | Yokota |
| 2005/0063694 A1 | 3/2005 | Nakazawa |
| 2010/0261961 A1 | 10/2010 | Scott et al. |
| 2011/0021873 A1 | 1/2011 | Ogawa |
| 2011/0208004 A1 | 8/2011 | Feingold et al. |
| 2014/0323805 A1 | 10/2014 | Naito |
| 2016/0183774 A1* | 6/2016 | Shiraishi .......... A61B 1/000094 |
| | | 600/328 |

FOREIGN PATENT DOCUMENTS

| | | |
|---|---|---|
| JP | 2005-91808 A | 4/2005 |
| JP | 2006-25913 A | 2/2006 |
| JP | 2006-288432 A | 10/2006 |
| JP | 2012-168383 A | 9/2012 |
| JP | 2013-453 A | 1/2013 |
| JP | 2013-230319 A | 11/2013 |
| WO | 2005/077249 A1 | 8/2005 |

OTHER PUBLICATIONS

Office Action dated Sep. 10, 2019, issued in Japanese Patent Application No. 2015-119731, 10 pages.

* cited by examiner

MEDICAL IMAGE ACQUISITION SYSTEM AND MEDICAL IMAGING DEVICE

CROSS-REFERENCE TO RELATED APPLICATIONS

The present application is a continuation of U.S. application Ser. No. 16/583,262, filed Sep. 26, 2019, which is a continuation application of, and claims the benefit of priority under 35 U.S.C. § 120 from, U.S. application Ser. No. 16/231,009, filed Dec. 21, 2018 (now U.S. Pat. No. 10,484,594), which is a continuation application of U.S. application Ser. No. 15/155,197, filed May 16, 2016, which claims priority to Japanese Patent Application No. 2015-119731, filed in Japan on Jun. 12, 2015, the entire contents of each are incorporated herein by reference.

BACKGROUND

The present disclosure relates to a medical image acquisition system and a medical imaging device.

In a medical field, medical image acquisition systems that image a subject using an imaging element so as to observe the subject have been known (For example, see Japanese Patent Application Laid-open No. 2006-25913).

An endoscope system as disclosed in Japanese Patent Application Laid-open No. 2006-25913 is a medical image acquisition system and includes an imaging device having a camera head with the imaging element and a camera cord as a signal transmitter that is electrically connected to the camera head, and an image processing device that processes an imaging signal received from the camera cord so as to generate an image signal based on the imaging signal. The camera head as disclosed in Japanese Patent Application Laid-open No. 2006-25913 includes a focal point position adjusting mechanism adjusting a focal point position.

The focal point position adjusting mechanism includes a lens frame that holds one or a plurality of lens(es) and is movable in the optical axis direction and a focus ring that is rotatable about an optical axis and inputs a movement amount of the lens frame based on a rotation amount thereof. A user moves the lens frame by rotating the focus ring so as to adjust the focal point position.

SUMMARY

When what is called manual focus of adjusting a focal point position in accordance with an operation by a user is performed like with the above-mentioned focus ring, detail operations such as minute adjustment of the focal point position may be needed in some cases. For example, the depth of field is shallow in some cases with pixel increase of an imaging element in order to provide a high-definition observation image. In such a case, a manual adjustment operation of the focal point position is frequently required to be performed, resulting in a cumbersome focus operation and increase in time taken for adjusting the focal point position.

In order to smoothly perform the adjustment operation of the focal point position, a technique of auto focus (AF) capable of adjusting the focal point position automatically can be employed. When a camera head of a different model type is mounted on an image processing device, incorporation of the AF configuration into the camera head requires pieces of detailed characteristic information of optical performance of a lens, driving performance of the lens (lens frame), and performance of the imaging element that are specific to the individual camera head. In the case where the image processing device is made to hold the pieces of characteristic information for individual camera heads capable of being mounted thereon, version upgrading of the image processing device may be necessary and maintenance may be needed every case when an information amount is increased, a camera head of a new model type is released, or version upgrading of the camera head is performed. This increases load on the user.

According to one aspect of the present disclosure, there is provided a medical image acquisition system including: an imaging device configured to image a subject so as to generate an imaging signal; and an image processing device electrically connected to the imaging device detachably and configured to process the received imaging signal so as to generate an image signal corresponding to the imaging signal. The imaging device includes: an imaging unit configured to receive light and convert the light into an electric signal so as to generate the imaging signal; an optical unit including a focus mechanism moving one or a plurality of lenses so as to adjust a focal point position, and configured to form an optical image on the imaging unit; a memory configured to store therein unique information of the imaging device; and an auto focus controller configured to totally control the imaging device and control driving of the focus mechanism by referring to the memory, the image processing device includes an auto focus evaluation unit configured to perform focusing evaluation based on the imaging signal, and the auto focus controller controls driving of the focus mechanism by referring to the unique information in accordance with an evaluation result by the auto focus evaluation unit.

According to another aspect of the present disclosure, there is provided a medical imaging device adapted to image a subject so as to generate an imaging signal, the medical imaging device including: an imaging unit configured to receive light and convert the light into an electric signal so as to generate the imaging signal; an optical unit including a focus mechanism moving one or a plurality of lenses so as to adjust a focal point position and configured to form an optical image on the imaging unit; a memory configured to store therein unique information of the medical imaging device; and an auto focus controller configured to totally control the medical imaging device and control driving of the focus mechanism by referring to the unique information in accordance with a focusing evaluation result of an image received from an external device.

DETAILED DESCRIPTION OF THE PREFERRED EMBODIMENTS

Figure 1:
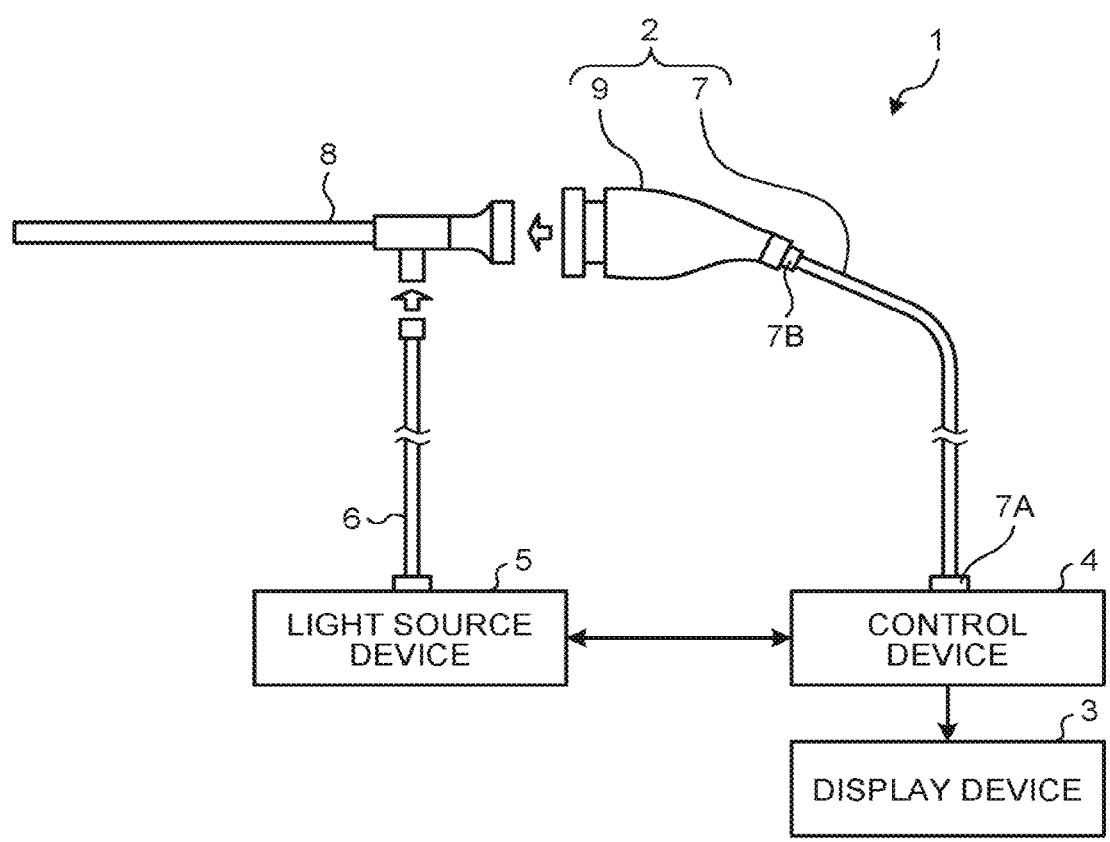
FIG. 1 is a view illustrating the schematic configuration of an endoscope device according to a first embodiment of the disclosure.

Hereinafter, embodiments of the present disclosure will be described. In the embodiments, medical endoscope devices that image an inner portion of a subject such as a patient and display an image are described as examples of a medical image acquisition system including a medical imaging device according to the disclosure. The embodiments do not limit the disclosure. In the accompanying drawings, the same reference numerals and symbols denote the same components.

First Embodiment

FIG. 1 is a view illustrating the schematic configuration of an endoscope device 1 according to a first embodiment of the disclosure. The endoscope device 1 is a device that is used in a medical field in order to observe a subject in (a living body of) an observation target such as a person. The endoscope device 1 includes an endoscope (insertion portion) 8, an imaging device 2 (medical imaging device), a display device 3, an image processing device 4, and a light source device 5, as illustrated in FIG. 1. The imaging device 2 and the image processing device 4 configure a medical image acquisition system. Although an endoscope device using a rigid scope as the endoscope 8 is described in the first embodiment, the endoscope device is not limited thereto and may use a flexible scope (not illustrated) as the endoscope 8.

An end of a light guide 6 is connected to the endoscope 8 and the light source device 5 supplies light for illuminating an inner portion of the living body to the other end of the light guide 6. One end of the light guide 6 is connected to the light source device 5 detachably and the other end thereof is connected to the insertion portion 8 detachably. The light guide 6 transfers the light supplied from the light source device 5 from one end to the other end and supplies the light to the endoscope 8.

The imaging device 2 images a subject image from the endoscope 8 and outputs the imaging result. The imaging device 2 includes a transmission cable 7 as a signal transmitter and a camera head 9 as illustrated in FIG. 1. In the first embodiment, the transmission cable 7 and the camera head 9 configure the medical imaging device.

The endoscope 8 is rigid and has an elongated shape, and is inserted into the living body. The endoscope 8 includes therein an optical system configured by one or a plurality of lens(es) and collecting the subject image. The endoscope 8 emits, from a tip thereof, the light supplied through the light guide 6 and irradiates the inner portion of the living body with the light. The optical system (a lens unit 91) in the endoscope 8 collects the light (subject image) with which the inner portion of the living body is irradiated.

The camera head 9 is connected to a base end of the endoscope 8 detachably. The camera head 9 images the subject image collected by the endoscope 8 and outputs an imaging signal generated by the imaging under control by the image processing device 4. It should be noted that the detail configuration of the camera head 9 will be described later.

The transmission cable 7 has a first connector unit 7A at one end and is connected to the image processing device 4 detachably with the first connector unit 7A interposed therebetween. The transmission cable 7 has a second connector unit 7B at the other end and is connected to the camera head 9 detachably with the second connector unit 7B interposed therebetween. To be specific, the transmission cable 7 is a cable in which a plurality of electric wirings (not illustrated) are arranged at the inner side of an outer cover as an outermost layer. The electric wirings are electric wirings for transmitting the imaging signal output from the camera head 9 and a control signal, a synchronization signal, clocks, and electric power output from the image processing device 4 to the camera head 9. Although the camera head 9 and the second connector unit 7B are connected detachably in the embodiment, the configuration is not limited thereto and the camera head 9 and the second connector unit 7B may be integrally fixed and connected.

The display device 3 displays an image generated by the image processing device 4 under control by the image processing device 4.

The image processing device 4 processes the imaging signal input from the camera head 9 through the transmission cable 7 and outputs an image signal to the display device 3. In addition, the image processing device 4 totally controls operations of the camera head 9 and the display device 3. The detail configuration of the image processing device 4 will be described later.

Figure 2:
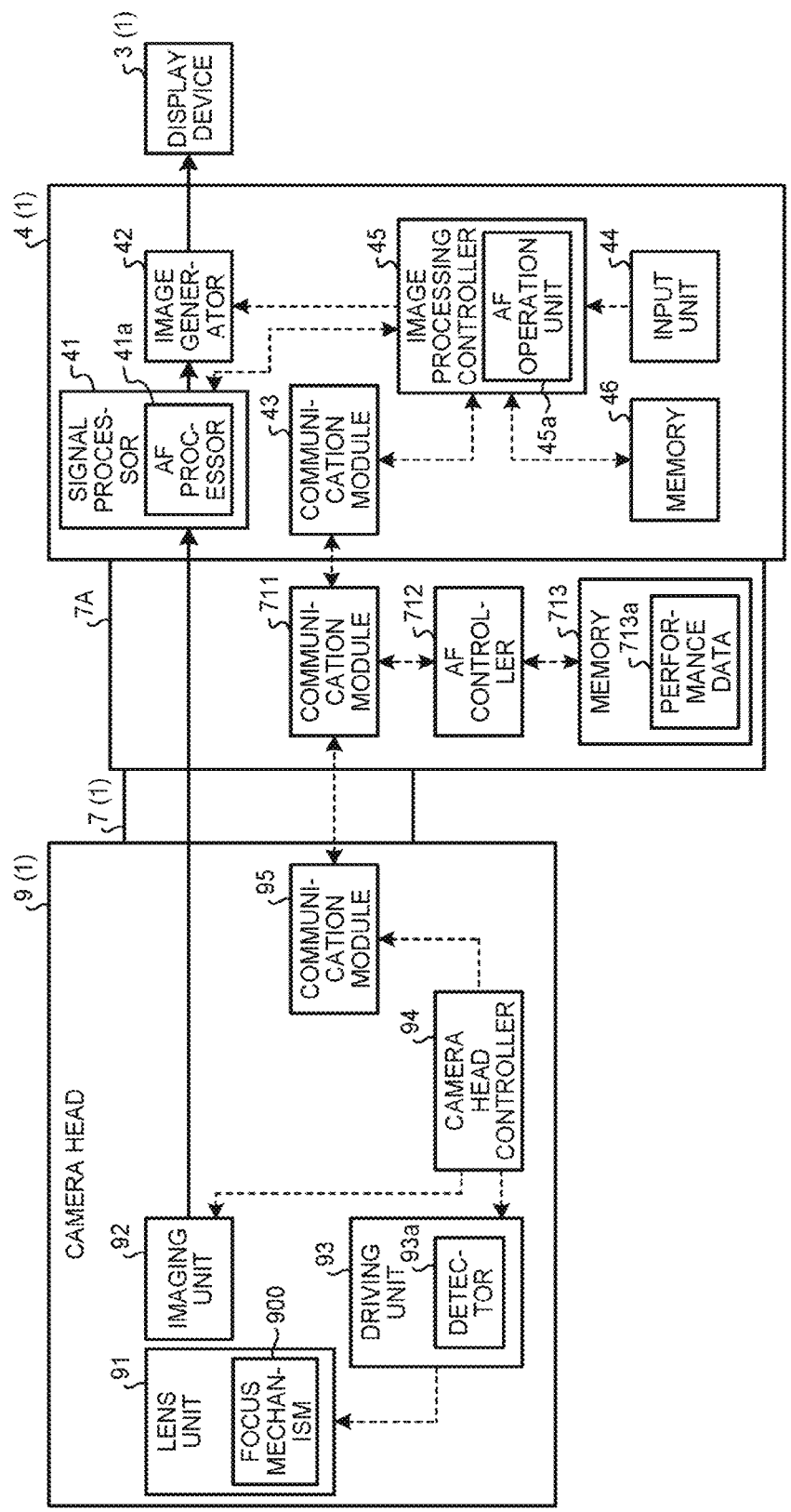
FIG. 2 is a block diagram illustrating the configurations of a camera head and an image processing device as illustrated in FIG. 1.

Next, the configurations of the imaging device 2 and the image processing device 4 will be described. FIG. 2 is a block diagram illustrating the configurations of the imaging device 2 and the image processing device 4. It should be noted that FIG. 2 omits illustration of the connector (second connector unit 7B) capable of connecting the camera head 9 and the transmission cable 7 detachably.

The configuration of the image processing device 4, the configuration of the first connector unit 7A, and the configuration of the camera head 9 will be described in this order below. A primary part of the disclosure is mainly described as the configuration of the image processing device 4. As illustrated in FIG. 2, the image processing device 4 includes a signal processor 41, an image generator 42, a communication module 43, an input unit 44, an image processing controller 45, and a memory 46. The image processing device 4 may include a power supply unit (not illustrated) or the like generating a power supply voltage for driving the image processing device 4 and the camera head 9, supplying it to the individual parts of the image processing device 4, and supplying it to the camera head 9 through the transmission cable 7.

The signal processor 41 performs signal processing such as noise removal and analog-to-digital (A/D) conversion if necessary on the imaging signal output from the camera head 9 and outputs a digitalized imaging signal (pulse signal) to the image generator 42.

The signal processor 41 generates synchronization signals and clocks for the imaging device 2 and the image processing device 4. The synchronization signal (for example, synchronization signal instructing an imaging timing of the camera head 9) and the clock (for example, clock for serial communication) to the imaging device 2 are sent to the imaging device 2 through a line (not illustrated). The imaging device 2 is driven based on the synchronization signal and the clock.

The image generator 42 generates the image signal for display that the display device 3 displays based on the imaging signal input from the signal processor 41. The image generator 42 executes predetermined signal processing on the imaging signal so as to generate the image signal for display including the subject image. Image processing includes pieces of processing of various types such as color correction, color enhancement, and contour enhancement. The image generator 42 outputs the generated image signal to the display device 3.

The communication module 43 outputs signals from the image processing device 4 that include a control signal transmitted from the image processing controller 45, which will be described later, to the imaging device 2. The communication module 43 outputs signals from the imaging device 2 to the image processing device 4. That is to say, the communication module 43 is a relay device that collects the signals to be output to the imaging device 2 from the individual parts of the image processing device 4 by parallel-to-serial conversion or the like and outputs them, and allocates the signals input from the imaging device 2 by serial-to-parallel conversion or the like and outputs them to the corresponding parts of the image processing device 4.

The input unit 44 is configured by a user interface such as a keyboard, a mouse, and a touch panel, and receives input of pieces of information of various types.

The image processing controller 45 performs driving control of the individual constituent components including the image processing device 4 and the camera head 9, input/output control of pieces of information to the corresponding constituent components, and the like. The image processing controller 45 generates a control signal containing a result of AF operation processing, which will be described later, by referring to communication information data (for example, communication format information) recorded in the memory 46, and transmits the generated control signal to the imaging device 2 (first connector unit 7A) through the communication module 43.

The image processing controller 45 outputs the control signal to the camera head 9 through the transmission cable 7.

The memory 46 is configured by a semiconductor memory such as a flash memory and a dynamic random access memory (DRAM) and records therein the communication information data (for example, communication format information). The memory 46 may record therein programs of various types that the image processing controller 45 executes.

The signal processor 41 includes an AF processor 41a. The AF processor 41a outputs a predetermined AF evaluation value of each frame based on an input imaging signal of the frame.

The image processing controller 45 includes an AF operation unit 45a. The AF operation unit 45a performs AF operation processing of selecting a frame or a focus lens position that is optimum as a focusing position based on the AF evaluation values of the respective frames from the AF processor 41a.

The result of the AF operation processing is output to an AF controller 712, which will be described later, through the communication module 43.

Although the AF processor 41a is provided in the signal processor 41 and the AF operation unit 45a is provided in the image processing controller 45 in the embodiment, the configuration is not limited thereto. Alternatively, both the AF processor 41a and the AF operation unit 45a may be provided together in the signal processor 41 or the image processing controller 45 or they may be provided as different devices.

The signal processor 41, the image generator 42, the communication module 43, and the image processing controller 45 as described above are made to operate by a general processor such as a central processing unit (CPU) having an internal memory (not illustrated) with programs recorded therein or exclusive processors such as operation circuits of various types executing specific functions, like an application specific integrated circuit (ASIC). Furthermore, they may be configured by a field programmable gate array (FPGA) (not illustrated) as one type of a programmable integrated circuit. When they are configured by the FPGA, a memory storing therein configuration data may be provided and the FPGA as the programmable integrated circuit may be configured by the configuration data read from the memory.

Subsequently, a primary part of the disclosure is mainly described as the configuration of the transmission cable 7. As illustrated in FIG. 2, the first connector unit 7A includes a communication module 711, the AF controller 712, and a memory 713.

The communication module 711 outputs signals transmitted from the image processing device 4, such as the control signal containing the result of the AF operation processing, and signals transmitted from the camera head to the AF controller 712. The communication module 711 outputs signals transmitted from the AF controller 712 that contain an AF driving signal, which will be described later, to the camera head 9 and the image processing device 4. That is to say, the communication module 711 is a relay device that collects signals to be output to the camera head 9 and the image processing device 4 from the individual parts of the transmission cable 7 including the AF controller 712 by parallel-to-serial conversion or the like and outputs them, and allocates the signals input from the camera head 9 and the image processing device 4 by serial-to-parallel conversion or the like and outputs them to the corresponding parts of the transmission cable 7 including the AF controller 712.

The AF controller 712 controls focus driving by a driving unit 93. The AF controller 712 generates an AF driving signal by referring to AF performance data (for example, reading timing and lens driving) 713a for AF control that is recorded in the memory 713. To be specific, the AF controller 712 generates the AF driving signal in accordance with the result of the AF operation processing that is received from the AF operation unit 45a of the image processing device 4 through the communication module 711. Furthermore, the AF controller 712 transmits the generated AF driving signal to the camera head 9 through the communication module 711 and the predetermined electric wiring included in the transmission cable 7.

The memory 713 is configured by a semiconductor memory such as a flash memory and a dynamic random access memory (DRAM) and records therein programs of various types and the like that the AF controller 712 executes. The memory 713 stores therein the AF performance data 713a related to AF performance of the camera head 9 as unique information. The AF performance data 713a includes pieces of performance data related to the AF driving, such as information of a movement distance (inter-frame distance) of a lens between the frames for which the imaging is made in the AF processing, setting information of a driver of the driving unit 93, information of a lens movement amount for an input signal to a focus mechanism 900, and individual variation data of the driving unit 93 including a detector 93a and the lens unit 91 including the focus mechanism 900.

The communication module 711 and the AF controller 712 as described above are made to operate by a general processor such as a central processing unit (CPU) having an internal memory (not illustrated) with programs recorded therein or exclusive processors such as operation circuits of various types executing specific functions, like an application specific integrated circuit (ASIC). Furthermore, they may be configured by a field programmable gate array (FPGA) (not illustrated) as one type of a programmable integrated circuit. When they are configured by the FPGA, a memory storing therein configuration data may be provided and the FPGA as the programmable integrated circuit may be configured by the configuration data read from the memory.

Although the AF controller 712 and the memory 713 are provided in the first connector unit 7A in the embodiment, the configuration is not limited thereto and at least one of them may be provided in the second connector unit 7B or another portion of the transmission cable 7.

Then, a primary part of the disclosure is mainly described as the configuration of the camera head 9. As illustrated in FIG. 2, the camera head 9 includes the lens unit 91, an imaging unit 92, the driving unit 93, a camera head controller 94, and a communication module 95.

The lens unit 91 is configured by one or a plurality of lens(es) and forms the subject image collected by the insertion portion 8 on an imaging surface of an imaging element (not illustrated) forming the imaging unit 92. The one or plurality of lens(es) are configured to be movable along an optical axis. The lens unit 91 includes an optical zoom mechanism (not illustrated) moving the one or plurality of lens(es) so as to change an angle of view and the focus mechanism 900 changing a focal point. The focus mechanism 900 will be described later. The lens unit 91 may include, in addition to the optical zoom mechanism and the focus mechanism 900, a diaphragm mechanism and an optical filter (for example, filter for cutting infrared light) capable of being detachably inserted on the optical axis.

The imaging unit 92 images the subject under control by the camera head controller 94. The imaging unit 92 is configured by a sensor chip provided by integrally forming an imaging element (not illustrated) such as a charge coupled device (CCD) and a complementary metal oxide semiconductor (CMOS) that receives the subject image formed by the lens unit 91 and converts it to an electric signal. In the case of the CCD, for example, a signal processor (not illustrated) that performs signal processing (A/D conversion or the like) on the electric signal (analog signal) from the imaging element and outputs the imaging signal is mounted on the sensor chip or the like. In the case of the CMOS, for example, a signal processor that performs signal processing (A/D conversion or the like) on the electric signal (analog signal) converted from the light and outputs the imaging signal is included in the imaging element. The imaging unit 92 converts the generated imaging signal into an imaging signal in accordance with a predetermined transmission system and outputs it to the image processing device 4 without passing through the communication module 95. In the first embodiment, the imaging unit 92 outputs RAW data, for example.

The driving unit 93 has the driver that causes the optical zoom mechanism and the focus mechanism 900 to operate so as to change the angle of view and the focal point position of the lens unit 91 under control by the AF controller 712. The driving unit 93 includes the detector 93a that receives a detection signal of a lens position (reference position) in the lens unit 91 and outputs it to the camera head controller 94.

The camera head controller 94 controls operations of the entire camera head 9 in accordance with the driving signal input from the first connector unit 7A through the transmission cable 7, an instruction signal output from an operation unit such as a switch provided on the outer surface of the camera head 9 in an exposed manner by a user operation on the operation unit, and the like. The camera head controller 94 outputs information related to the current state of the camera head 9 to the image processing device 4 through the transmission cable 7.

The communication module 95 outputs the signals transmitted from the transmission cable 7 that contain the AF driving signal and the signals transmitted from the image processing device 4 to the corresponding parts in the camera head 9, such as the camera head controller 94. The communication module 95 converts the information related to the current state of the camera head 9, and the like into a signal format in accordance with the predetermined transmission system and outputs the converted signal to the transmission cable 7 and the image processing device 4 through the transmission cable 7. That is to say, the communication module 95 is a relay device that allocates the signals input from the image processing device 4 and the transmission cable 7 by the serial-to-parallel conversion or the like and outputs them to the corresponding parts of the camera head 9, and collects the signals to be output to the image processing device 4 and the transmission cable 7 from the individual parts of the camera head 9 by the parallel serial conversion or the like and outputs them.

The driving unit 93, the camera head controller 94, and the communication module 95 as described above are made to operate by a general processor such as a central processing unit (CPU) having an internal memory (not illustrated) with programs recorded therein or exclusive processors such as operation circuits of various types executing specific functions, like an application specific integrated circuit (ASIC). Furthermore, they may be configured by a field programmable gate array (FPGA) (not illustrated) as one type of a programmable integrated circuit. When they are configured by the FPGA, a memory storing therein configuration data may be provided and the FPGA as the programmable integrated circuit may be configured by the configuration data read from the memory.

A signal processor that performs signal processing on the imaging signal generated by the communication module 95 and the imaging unit 92 may be configured in the camera head 9 or the transmission cable 7. An imaging clock for driving the imaging unit 92 and a driving clock for driving the driving unit 93 may be generated based on a reference clock generated by an oscillator provided in the camera head 9 and may be output to the imaging unit 92 and the driving unit 93, respectively. Furthermore, timing signals of pieces of processing of various types in the imaging unit 92, the driving unit 93, and the camera head controller 94 may be generated based on the synchronization signals input from the image processing device 4 and the first connector unit 7A through the transmission cable 7 and may be output to the imaging unit 92, the driving unit 93, and the camera head controller 94, respectively.

Figure 3:
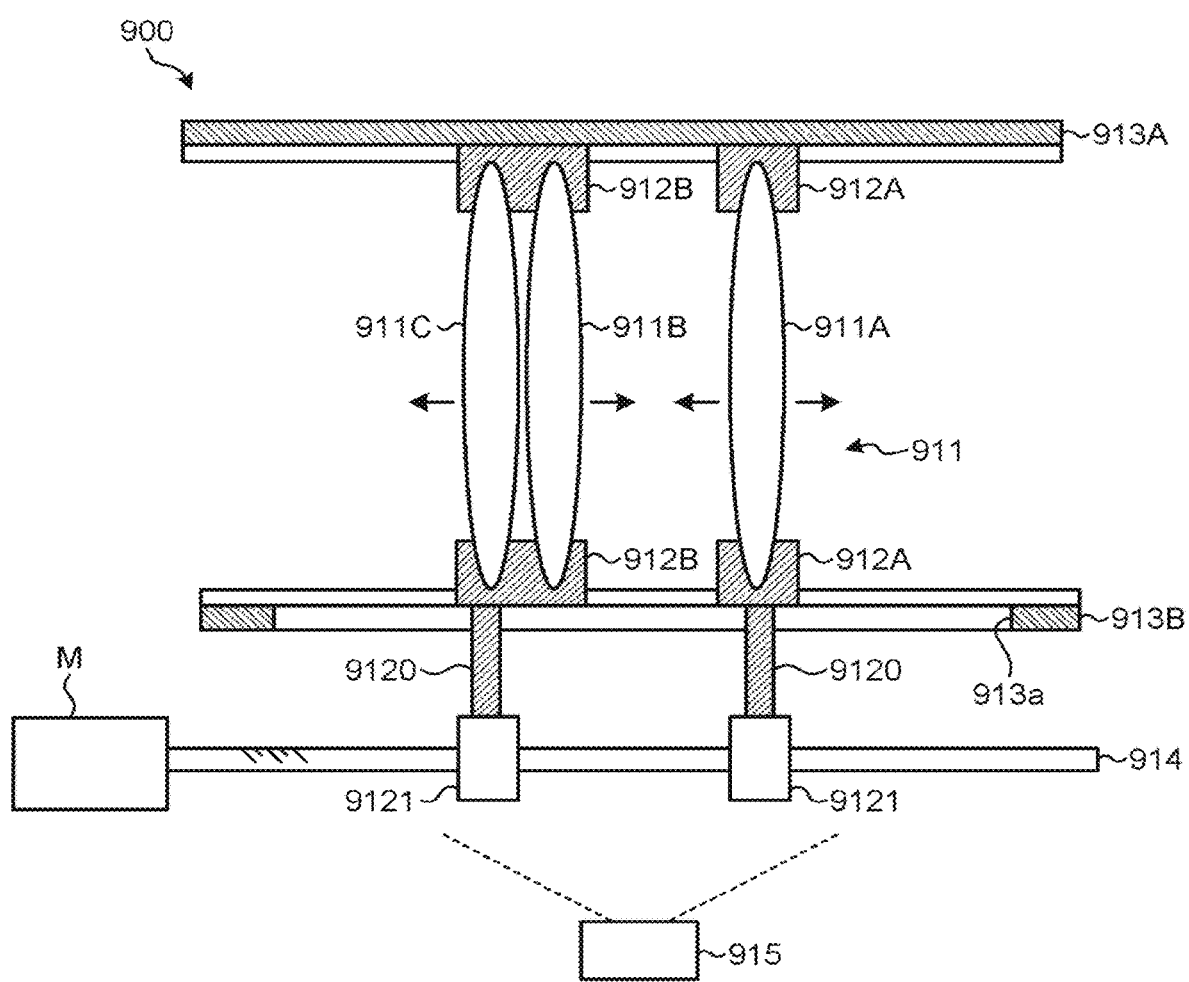
FIG. 3 is a schematic plan view for explaining a focus mechanism of a lens unit in the first embodiment of the disclosure.

The focus mechanism of the lens unit 91 will be described with reference to FIG. 3. FIG. 3 is a schematic plan view for explaining the focus mechanism of the lens unit in the first embodiment. The focus mechanism 900 as illustrated in FIG. 3 includes a lens group 911 formed by a plurality of lenses (lenses 911A to 911C), a first lens frame 912A, a second lens frame 912B, a first supporting shaft 913A, a second supporting shaft 913B, a rotating shaft 914, a motor M, and a lens position detector 915.

The lens group 911 is held by the lens frames (the first lens frame 912A and the second lens frame 912B: movable optical members), and is provided so as to be movable along the axial direction of the rotating shaft 914. In the first embodiment, the first lens frame 912A holding the lens 911A and the second lens frame 912B holding the lenses 911B and 911C cause the lenses 911A to 911C to move in the optical axis direction. The lens group in the focus mechanism 900 may be formed by one lens or two or equal to or more than four lenses instead of the lens group formed by three lenses as illustrated in FIG. 3.

The first lens frame 912A holds the lens 911A. The first lens frame 912A includes a transfer unit having a nut 9120 screwed with the rotating shaft 914 and converting rotating force of the rotating shaft 914 into driving force in the optical axis direction and a transfer unit 9121 transferring the driving force provided by the conversion by the nut 9120 to the first lens frame 912A. The configuration of the lens frame is not limited thereto as long as the lens frame holds the lens and is movable in the optical axis direction.

The second lens frame 912B holds the lenses 911B and 911C. The second lens frame 912B includes a transfer unit having the nut 9120 screwed with the rotating shaft 914 and converting the rotating force of the rotating shaft 914 into driving force in the optical axis direction and the transfer unit 9121 transferring the driving force provided by the conversion by the nut 9120 to the second lens frame 912B.

The first supporting shaft 913A and the second supporting shaft 913B extend in the optical axis direction. The first supporting shaft 913A and the second supporting shaft 913B hold the first lens frame 912A and the second lens frame 912B such that the individual lenses of the lens group 911 do not incline with respect to the optical axis and the individual lenses of the lens group 911 (lens frames) are movable in the optical axis direction. A through-hole 913a through which the transfer units 9121 are inserted is formed in the second supporting shaft 913B.

The rotating shaft 914 is connected to the motor M and rotates about a lengthwise axis in accordance with the rotating force from the motor M. For example, a spiral groove is formed in the rotating shaft 914 and the nuts 9120 are engaged with the groove so as to convert the rotation of the rotating shaft 914 into driving force in the axial direction.

In the focus mechanism 900, rotation of the motor M causes the rotating shaft 914 to rotate under control by the driving unit 93. The rotation of the rotating shaft 914 causes the first lens frame 912A and the second lens frame 912B to move along the axial direction through the first transfer unit 9121 and the second transfer unit 9121, respectively. With this, the lenses 911A to 911C held by the corresponding lens frames may be moved in the axial direction.

The lens position detector 915 detects distances to the first lens frame 912A and the second lens frame 912B from the reference positions. The lens position detector 915 emits infrared rays, for example, and receives light returned from the lens frames. Then, the lens position detector 915 outputs, to the detector 93a, detection signals (light detection signals) related to positions (distances) of the first lens frame 912A and the second lens frame 912B relative to the reference positions. The lens position detector 915 may use a photo interrupter or the like instead of distance measurement with the infrared rays as described above.

Subsequently, the AF processing by the endoscope device 1 is described with reference back to FIG. 2. When the AF processor 41a receives input of imaging signals of a plurality of frames, it outputs AF evaluation values for the respective frames. Thereafter, the AF operation unit 45a provided in the image processing controller 45 selects a frame that is optimum as the focusing position based on the AF evaluation values and generates optimum frame information (focusing evaluation) as information of the frame optimum for focusing. Then, the AF operation unit 45a outputs an AF control signal containing the optimum frame information to the AF controller 712 through the communication modules 43 and 711. In the first embodiment, the AF processor 41a and the AF operation unit 45a configure an AF evaluation unit. The AF control signal may contain information of the lens movement direction (direction toward or away from the subject).

The above-mentioned selection of the frame may be made using a well-known AF method such as contrast AF, phase difference AF, and AF using a space recognition technique. The AF processor 41a outputs well-known AF evaluation values in accordance with the employed AF method, such as contrast values for the respective frames, and the AF operation unit 45a selects a frame based on the well-known AF evaluation values in accordance with the employed AF method, such as a frame having the largest contrast value.

When the AF controller 712 receives the AF control signal, it generates an AF driving signal for moving the lens group 911 (the first lens frame 912A and the second lens frame 912B) in the movement direction and by the movement distance (for example, movement distance to positions corresponding to the optimum frame information from the current positions) to positions corresponding to the optimum frame information by referring to the performance data 713a. Then, the AF controller 712 outputs the generated AF driving signal to the camera head controller 94 through the communication modules 711 and 95. The camera head controller 94 controls the driving unit 93 based on the received driving signal so as to move the lens group 911 (the first lens frame 912A and the second lens frame 912B). In this case, the driving unit 93 causes the rotating shaft 914 to move in accordance with the optimum frame information from the current position while checking a detection result by the detector 93a so as to move the lens group 911 (the first lens frame 912A and the second lens frame 912B).

With the above-mentioned first embodiment, the image processing device 4 outputs, to the imaging device 2, the information of the frame optimum for the focusing in the imaging signal imaged by the camera head 9, wherein the information does not depend on individual difference and model type difference of the camera head 9. The imaging device 2 performs the focus driving based on the information of the frame optimum for the focusing from the image processing device 4 with reference to pieces of information of the individual difference and the model type difference of the camera head 9 that are related to AF, in particular. The movement amount of the lenses in accordance with the performance of the connected imaging device 2 is therefore set even when the different imaging device 2 is connected to the image processing device 4, thereby performing the AF processing in view of the performance of each imaging device 2. The first embodiment may reduce burden on the user regardless of the characteristics of the camera head.

Furthermore, in the above-mentioned first embodiment, the user grips the camera head 9 of the imaging device 2 in order to image a desired observation site while adjusting a position of the camera head 9 relative to the subject. When the user grips the camera head 9, heat is easy to be accumulated in the camera head 9. When the inner portion of the camera head 9 is increased in temperature, quality of the imaging signal that is output may be deteriorated with the increase in the temperature of the imaging element. The camera head 9 that is gripped is desired to be reduced in size and weight as less as possible, but increase in the number of built-in objects may inhibit the reduction in size and weight. It is preferable that the built-in objects in the camera head 9 be minimized and, in particular, no heat generator such as the CPU be provided in the camera head 9 if circumstances allow. Increase of the camera head in size and weight and accumulation of heat may be prevented by providing the optical system (lens unit 91) and the imaging element (imaging unit 92) as minimum necessary components in the camera head 9 and providing components other than them in the transmission cable 7 if circumstances allow. For example, in order to transmit the signals between the camera head 9 and the image processing device 4 efficiently and reduce the number of signal lines, a parallel-to-serial element or a serial-to-parallel element for converting a parallel signal from the camera head 9 into a serial signal or converting a serial signal to the camera head 9 into a parallel signal may be provided in the camera head 9. In the first embodiment, a processor element for AF control, in particular, is preferably provided in the transmission cable 7. Although the memory 713 is provided in the transmission cable 7, it may be provided in the camera head 9 when it is reduced in size. Furthermore, when the AF controller 712 generates less heat and is reduced in size, the AF controller 712 may be provided in the camera head 9.

With the above-mentioned first embodiment, the first connector unit 7A on a side away from the camera head 9 includes the AF controller 712. This configuration enables the CPU and the like generating heat with driving to be away from the camera head 9 as far as possible, thereby reducing influence of heat on the camera head 9.

First Modification of First Embodiment

Figure 4:
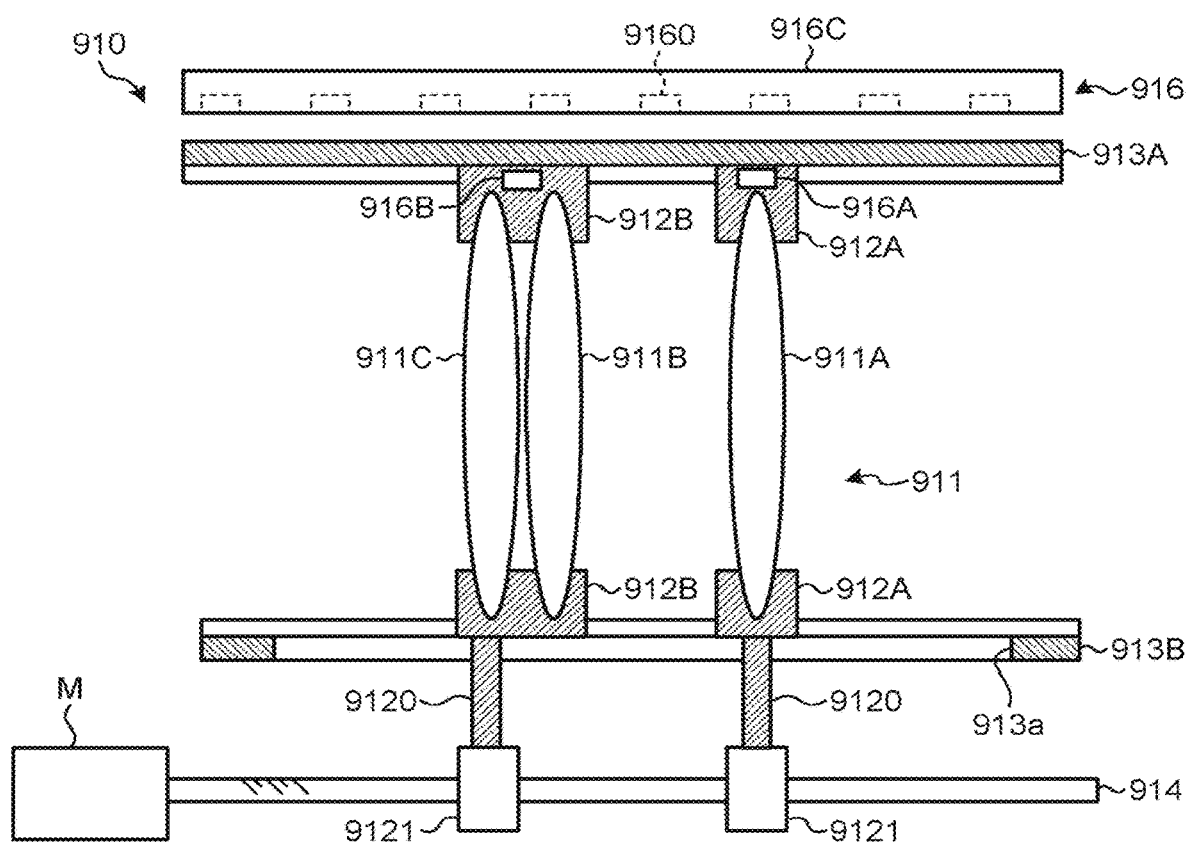
FIG. 4 is a schematic plan view for explaining a focus mechanism of a lens unit according to a first modification of the first embodiment of the disclosure.

Subsequently, a first modification of the first embodiment of the disclosure will be described. FIG. 4 is a schematic plan view for explaining a focus mechanism of a lens unit according to a first modification of the first embodiment of the disclosure. Although the lens position detector 915 measures the distances of the lens frames from the reference positions based on the optical signals acquired with the light (infrared rays) in the above-mentioned first embodiment, the positions of the lens frames are detected using magnets in the first modification.

A focus mechanism 910 in the first modification includes the lens group 911 formed by the plurality of lenses (lenses 911A to 911C), the first lens frame 912A, the second lens frame 912B, the first supporting shaft 913A, the second supporting shaft 913B, and the rotating shaft 914 as described above, and a lens position detector 916.

The lens position detector 916 detects the positions of the first lens frame 912A and the second lens frame 912B. To be specific, the lens position detector 916 includes a first permanent magnet 916A, a second permanent magnet 916B, and a Hall element holding unit 916C.

The first permanent magnet 916A is provided in the first lens frame 912A. The second permanent magnet 916B is provided in the second lens frame 912B.

The Hall element holding unit 916C extends in parallel with the second supporting shaft 913B and has a plurality of Hall elements 9160 arranged along the extension direction. The Hall elements 9160 detect magnetic fields using a Hall effect and convert the detected magnetic fields (magnetism) into electric signals. The individual Hall elements 9160 output the electric signals provided by the conversion as detection signals to the detector 93a.

When the detector 93a receives the detection signals, it determines the Hall elements 9160 having the largest voltage values and detects the determined Hall elements 9160 as the positions of the lens frames. To be specific, the detector 93a determines two Hall elements of the Hall element corresponding to the position of the first permanent magnet 916A and the Hall element corresponding to the position of the second permanent magnet 916B. Thus, the positions of the current lens frames may be detected.

Although the first permanent magnet 916A and the second permanent magnet 916B are provided in the respective lens frames in the above-described first modification, any one of the permanent magnets may be arranged so as to detect the position of the lens frame on which the permanent magnet is arranged.

Second Modification of First Embodiment

Figure 5:
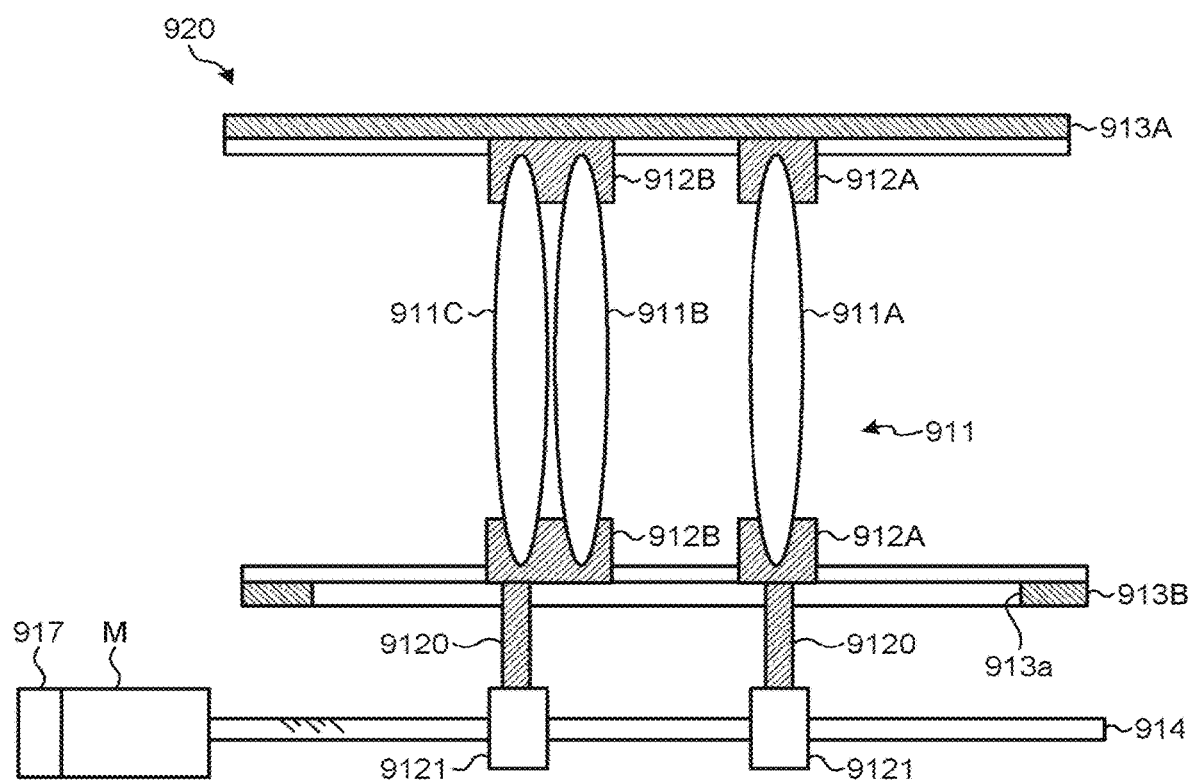
FIG. 5 is a schematic plan view for explaining a focus mechanism of a lens unit according to a second modification of the first embodiment of the disclosure.

Subsequently, a second modification of the first embodiment of the disclosure will be described. FIG. 5 is a schematic plan view for explaining a focus mechanism of a lens unit according to a second modification of the first embodiment of the disclosure. Although the lens position detector 915 measures the distances of the lens frames from the reference positions based on the optical signals acquired with the light (infrared rays) in the above-mentioned first embodiment, the positions of the lens frames are detected by detecting a rotation amount of the motor in the second modification.

A focus mechanism 920 in the second modification includes the lens group 911 formed by the plurality of lenses (lenses 911A to 911C), the first lens frame 912A, the second lens frame 912B, the first supporting shaft 913A, the second supporting shaft 913B, and the rotating shaft 914 as described above, and a lens position detector 917.

The lens position detector 917 detects the position indicating the rotation amount of the motor M. To be specific, the lens position detector 917 is configured by a rotary encoder, for example. The lens position detector 917 outputs the detected rotation amount (displacement with rotation) of the motor M as a detection signal to the detector 93a.

When the detector 93a receives the rotation amount (displacement with rotation) of the motor M from the detection signal, it converts the rotation amount into a movement amount of the lens frame and detects the movement amount after conversion as the position of the lens frame. In this case, the memory 713 or the like stores therein the previous position of the lens frame and the position of the lens frame is determined by adding the movement amount to the previous position. With this determination, the current position of the lens frame may be detected. It should be noted that as the position of the lens frame, the respective positions of the first lens frame 912A and the second lens frame 912B may be determined or any one of the positions of them may be detected. Information (for example, conversion coefficient) related to the conversion of the rotation amount (displacement with rotation) of the motor M into the movement amount of the lens frame is previously stored as the performance data 713a.

Second Embodiment

Figure 6:
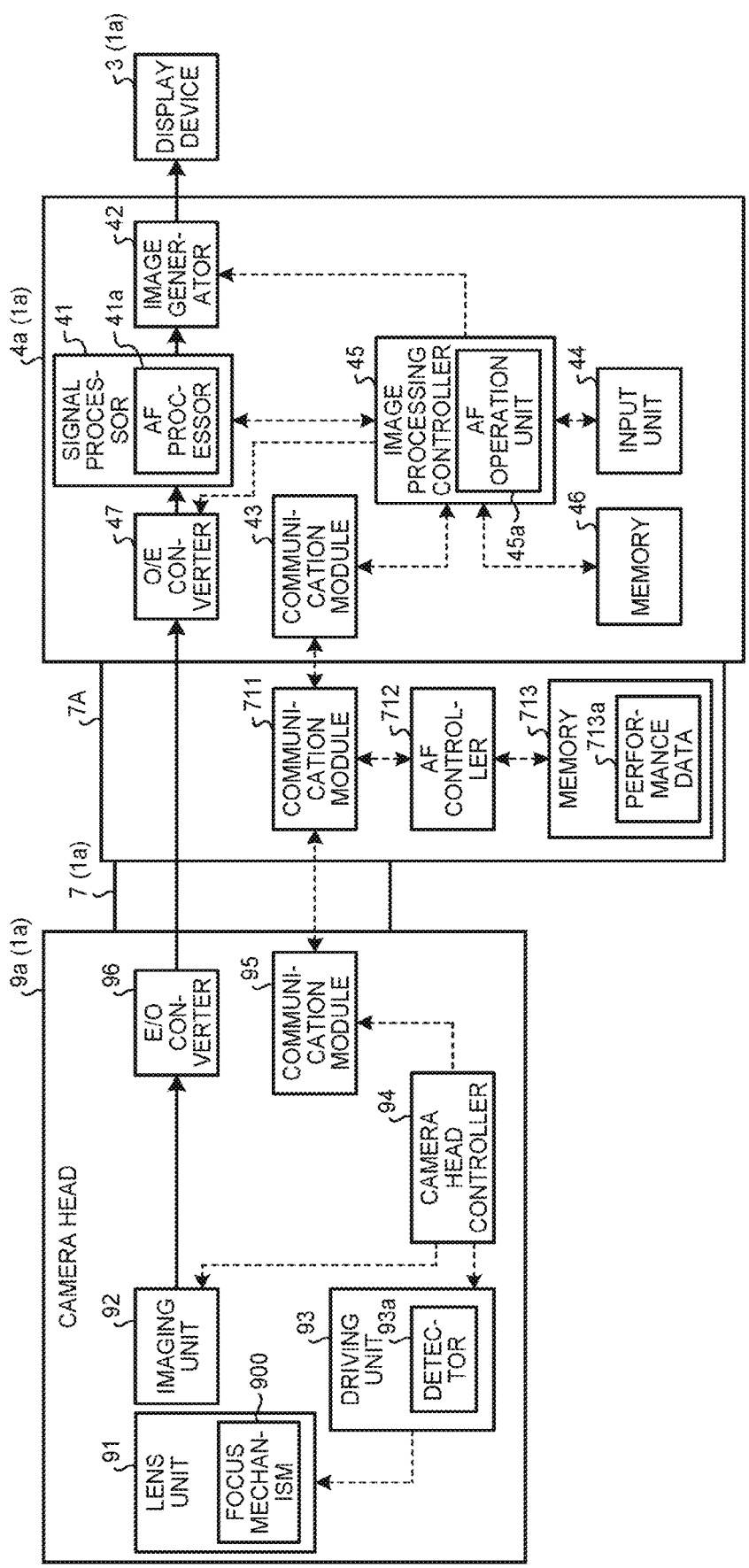
FIG. 6 is a block diagram illustrating the configurations of a camera head and an image processing device according to a second embodiment of the disclosure.

Next, a second embodiment of the disclosure will be described. FIG. 6 is a block diagram illustrating the configurations of a camera head and an image processing device in the second embodiment. The same reference numerals and symbols denote the same configurations as the above-mentioned configurations. Although the imaging signal is transmitted as the electric signal between the imaging unit 92 and the signal processor 41 through the transmission cable 7 with the electric wirings arranged therein in the above-mentioned first embodiment, the imaging signal is transmitted as an optical signal in the second embodiment.

An endoscope device 1a in the second embodiment includes the endoscope 8, the imaging device 2, and the display device 3 as described above, and an image processing device 4a. In the second embodiment, the imaging device 2 includes a camera head 9a instead of the camera head 9.

As illustrated in FIG. 6, the image processing device 4a includes the signal processor 41, the image generator 42, the communication module 43, the input unit 44, the image processing controller 45, and the memory 46 as described above, and an optical-to-electrical converter (O/E) 47.

As illustrated in FIG. 6, the camera head 9a includes the lens unit 91, the imaging unit 92, the driving unit 93, the camera head controller 94, and the communication module 95 as described above, and an electrical-to-optical (E/O) converter 96.

The E/O converter 96 performs electro-optical conversion processing on the imaging signal as the electric signal input from the imaging unit 92 so as to convert it into an optical signal, and outputs the imaging signal as the optical signal to the image processing device 4a.

The O/E converter 47 receives the optical signal from the camera head 9a (E/O converter 96), performs photoelectric conversion processing on the received optical signal so as to convert it into an electric signal, and outputs the imaging signal as the electric signal after conversion to the signal processor 41. After the imaging signal is input to the signal processor 41, the image generator 42 generates the image signal as described above.

The second embodiment may provide the effects provided in the above-mentioned first embodiment. In addition, transmission of the imaging signal between the camera head 9a and the image processing device 4a is transmission of the optical signal, so that even when a transmission path is long like the transmission cable 7, more pieces of information may be transmitted at a time at higher speed while reducing attenuation in comparison with the electric signal.

Third Embodiment

Figure 7:
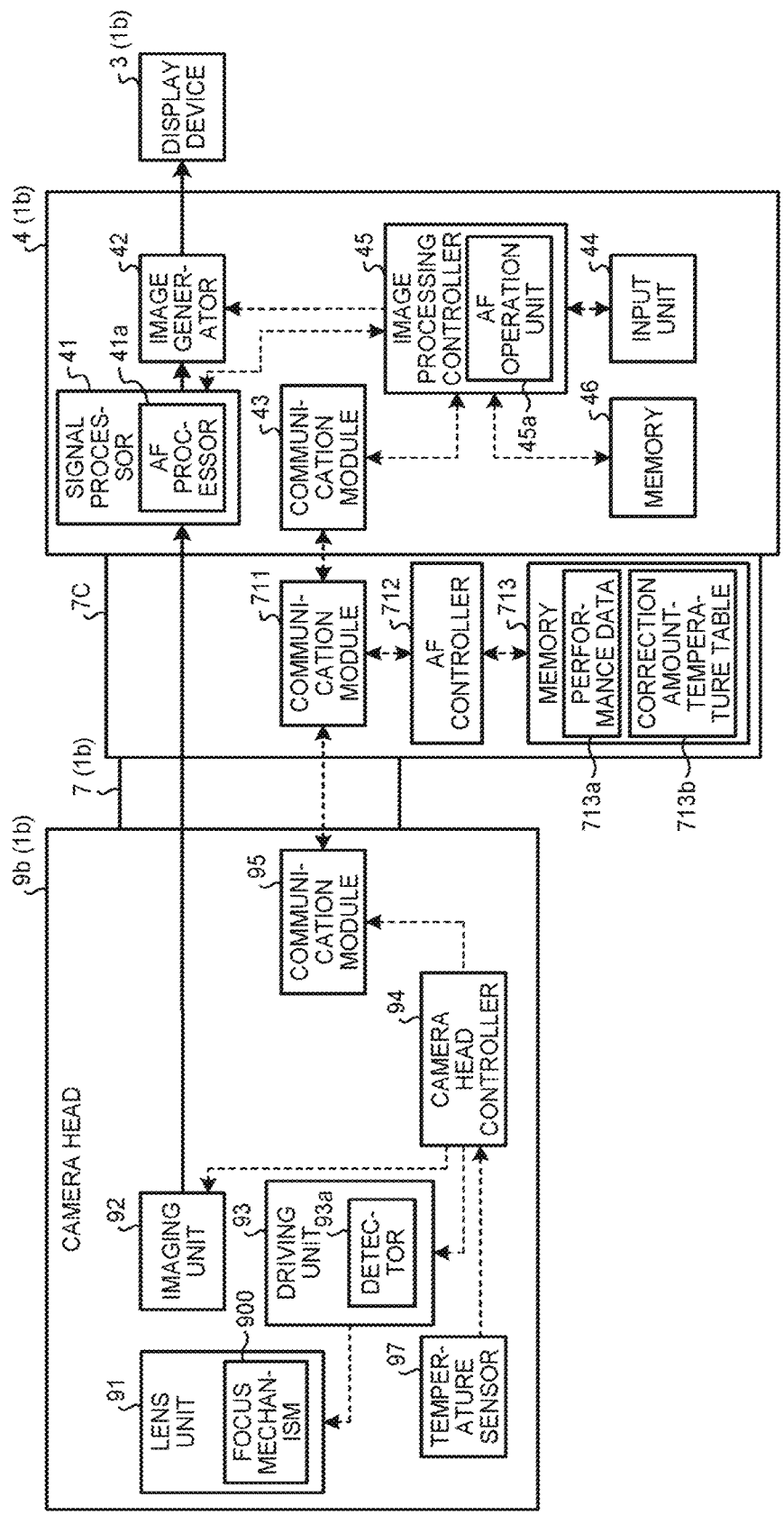
FIG. 7 is a block diagram illustrating the configurations of a camera head and an image processing device according to a third embodiment of the disclosure.

Next, a third embodiment of the disclosure will be described. FIG. 7 is a block diagram illustrating the configurations of a camera head and an image processing device in the third embodiment. The same reference numerals and symbols denote the same configurations as the above-mentioned configurations. Although the lens frames are moved based on the performance data 713a in the above-mentioned first embodiment, the lens frames are moved after temperature information is further acquired in the third embodiment.

An endoscope device 1b in the third embodiment includes the endoscope 8, the imaging device 2, the display device 3, and the image processing device 4 as described above. In the third embodiment, the imaging device 2 includes a first connector unit 7C and a camera head 9b instead of the first connector unit 7A and the camera head 9.

As illustrated in FIG. 7, the camera head 9b includes the lens unit 91, the imaging unit 92, the driving unit 93, the camera head controller 94, and the communication module 95 as described above, and a temperature sensor 97.

The temperature sensor 97 is provided at a front end of the camera head near the lens unit 91. To be specific, the temperature sensor 97 is provided near the lens frames (the first lens frame 912A and the second lens frame 912B) of the focus mechanism 900, for example. The temperature sensor 97 is configured by a thermocouple, a thermometric resistor, a thermistor, or the like, and measures the temperature near the lens frames (the first lens frame 912A and the second lens frame 912B). The temperature sensor 97 outputs a detection signal containing the temperature measurement result to the detector 93a.

As illustrated in FIG. 7, the first connector unit 7C includes the communication module 711, the AF controller 712, and the memory 713. The memory 713 stores therein a correction amount-temperature table 713b in addition to the above-mentioned performance data 713a.

The correction amount-temperature table 713b is a table indicating a relation between the temperature detected by the temperature sensor 97 and a correction amount of a lens frame movement amount. To be specific, for example, the lens frames expand under a high-temperature environment, whereas the viscosity of a lubricant for sliding is increased under a low-temperature environment. Under these environments, friction force in the sliding is increased, and sliding characteristics along the first supporting shaft 913A and the second supporting shaft 913B change. The correction amount-temperature table 713b is a table for correcting the inter-frame distance in accordance with the change in the movement amount with thermal expansion of the lens frames, for example, or correcting driving force or driving speed of the lens frames in accordance with the change in the viscosity of the lubricant for sliding for the inter-frame distance of the frames that is stored as the performance data 713a. For example, the correction amount-temperature table 713b is data provided by performing linear interpolation, quadratic curve interpolation, or the like on data measured by every 5 degrees.

The AF controller 712 determines settings related to driving control of the lens frames based on the detection result by the temperature sensor 97, the correction amount-temperature table 713b, and the optimum frame information. With these settings, driving of the lens frames is controlled in consideration of movement conditions that change with the temperature so as to control the driving of the lens frames in accordance with the characteristics of the imaging device 2 more specifically.

The third embodiment may provide the effects provided in the above-mentioned first embodiment. In addition, the imaging device 2 controls the driving of the lens frames based on the detection result by the temperature sensor 97, so that the lenses (lens frames) may be moved with higher accuracy. In particular, the imaging unit 92 (imaging element) and the communication module 95 are easy to generate heat with energization. When the heat is transferred to the lens frames and the like, the movement amount, the driving force, the driving speed, and the like change in some cases. The lenses (lens frames) may be moved with high accuracy by changing the driving control in consideration of the temperature as in the third embodiment.

Fourth Embodiment

Figure 8:
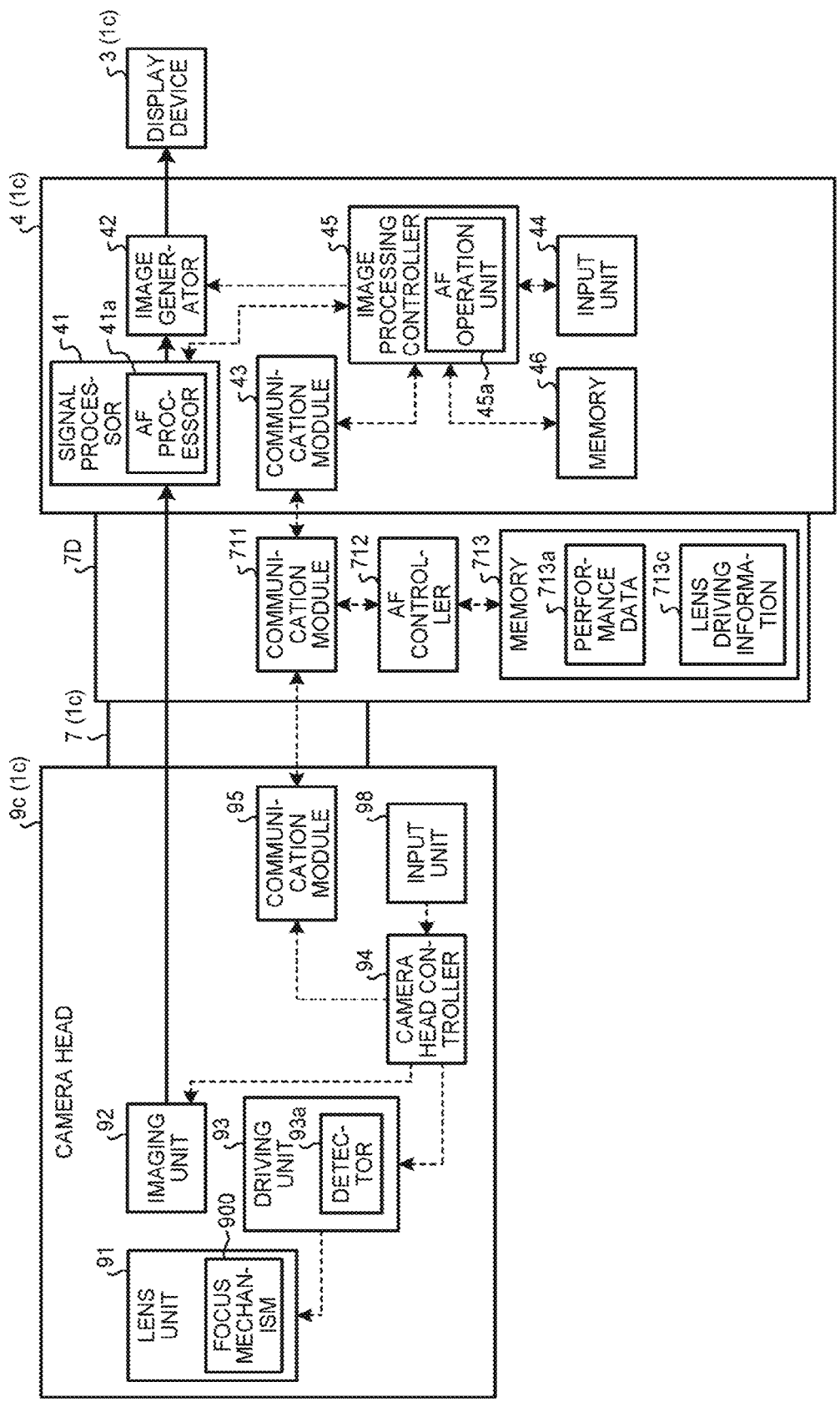
FIG. 8 is a block diagram illustrating the configurations of a camera head and an image processing device according to a fourth embodiment of the disclosure.

Next, a fourth embodiment of the disclosure will be described. FIG. 8 is a block diagram illustrating the configurations of a camera head and an image processing device in the fourth embodiment. The same reference numerals and symbols denote the same configurations as the above-mentioned configurations. In the fourth embodiment, in the configuration in the above-mentioned first embodiment, the camera head further includes an input unit 98 receiving input of a lens driving instruction.

An endoscope device 1c in the fourth embodiment includes the endoscope 8, the imaging device 2, the display device 3, and the image processing device 4 as described above. In the fourth embodiment, the imaging device 2 includes a first connector unit 7D and a camera head 9c instead of the first connector unit 7A and the camera head 9.

As illustrated in FIG. 8, the camera head 9c includes the lens unit 91, the imaging unit 92, the driving unit 93, the camera head controller 94, and the communication module 95 as described above, and the input unit 98.

The input unit 98 is configured by a user interface such as a key, a dial-type input unit (including a sensor detecting rotation of the dial), and a lever, and receives input of information related to movement of the lens group 911 (the first lens frame 912A and the second lens frame 912B) of the focus mechanism. The information related to the movement includes pieces of information of the movement amount, the movement direction, the movement speed, and the like of the lens group 911. For example, when the dial-type input unit is used, a signal instructing the movement direction in accordance with the rotation direction is input, a signal instructing the movement amount in accordance with the rotation amount is input, and a signal instructing the movement speed in accordance with the rotation speed is input. The input unit 98 further receives input of an instruction signal to execute the AF processing by a key operation.

As illustrated in FIG. 8, the first connector unit 7D includes the communication module 711, the AF controller 712, and the memory 713. The memory 713 stores therein lens driving information 713c in addition to the above-mentioned performance data 713a.

The lens driving information 713c is driving information of the lenses (lens frames) in accordance with the instruction signals received by the input unit 98. To be specific, when the instruction signals are input using the above-mentioned dial-type input unit, the lens driving information 713c contains information correlating any one direction (advancement or retreat direction with respect to the imaging unit 92) in the optical axis direction with the rotation direction, information correlating the movement amount of the lenses (lens frames) in the optical axis direction with the rotation amount, and information correlating the movement speed of the lenses (lens frames) with the rotation speed. It should be noted that the rotation speed and the movement amount may be correlated with each other.

When the instruction signals are input through the input unit 98, the AF controller 712 generates a driving signal related to the movement of the lenses (lens frames) in accordance with the instruction signals by referring to the lens driving information 713c and outputs it to the camera head controller 94. The camera head controller 94 outputs the driving signal to the driving unit 93 and moves the lenses (lens frames) in accordance with the driving signal under control by the driving unit 93.

In the fourth embodiment, the user inputs the instruction signals through the input unit 98 so as to move the lens manually (manual focusing (MF)). With this, the MF processing in the fourth embodiment and the AF processing as described in the first embodiment may be used in combination. The MF processing in the fourth embodiment may be processing of adjusting the focal point position while checking, by the user, an image without performing the AF processing or may be processing of finely adjusting the focal point position while checking, by the user, the image after the AF processing. The MF processing and the AF processing may be switched by a key operation on the input unit 98.

The fourth embodiment may provide the effects provided in the above-mentioned first embodiment. In addition, the lenses are moved manually (MF) by input of the instruction signals through the input unit 98 by the user, so that the focal point position may be adjusted by moving the lenses (lens frames) with higher degree of freedom.

Fifth Embodiment

Figure 9:
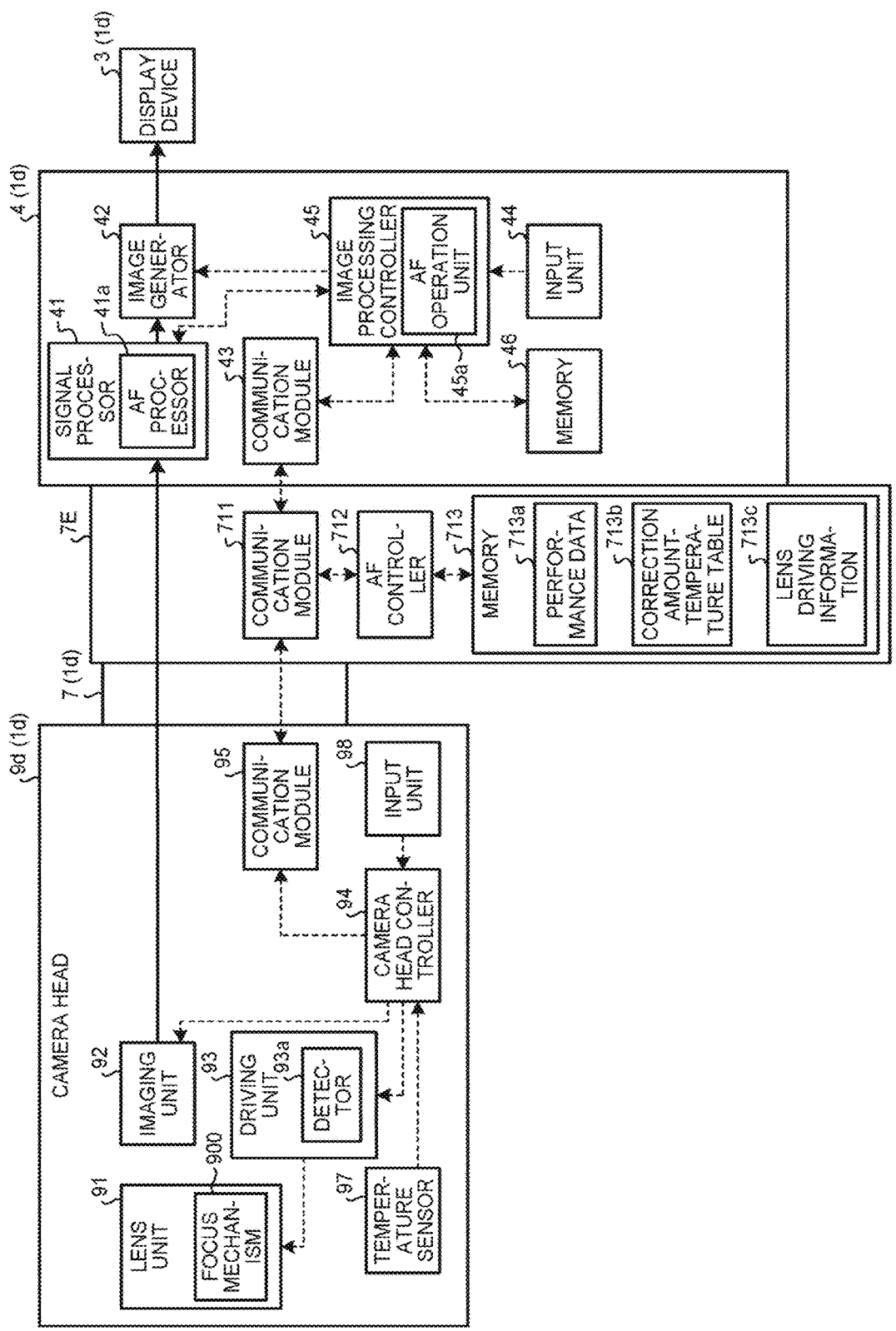
FIG. 9 is a block diagram illustrating the configurations of a camera head and an image processing device according to a fifth embodiment of the disclosure.

Next, a fifth embodiment of the disclosure will be described. FIG. 9 is a block diagram illustrating the configurations of a camera head and an image processing device in the fifth embodiment. The same reference numerals and symbols denote the same configurations as the above-mentioned configurations. In the fifth embodiment, the lens driving control by temperature detection and the MF processing by the user may be performed while the above-mentioned configurations in the third and fourth embodiments are combined.

An endoscope device 1d in the fifth embodiment includes the endoscope 8, the imaging device 2, the display device 3, and the image processing device 4 as described above. In the fifth embodiment, the imaging device 2 includes a first connector unit 7E and a camera head 9d instead of the first connector unit 7A and the camera head 9.

As illustrated in FIG. 9, the camera head 9d includes the lens unit 91, the imaging unit 92, the driving unit 93, the camera head controller 94, the communication module 95, the temperature sensor 97, and the input unit 98 as described above.

As illustrated in FIG. 9, the first connector unit 7E includes the communication module 711, the AF controller 712, and the memory 713. The memory 713 stores therein the performance data 713a, the correction amount-temperature table 713b, and the lens driving information 713c as described above.

The AF controller 712 determines the settings related to the driving control of the lens frames based on the detection result by the temperature sensor 97, the correction amount-temperature table 713b, and the optimum frame information as described above. When the instruction signals are input through the input unit 98, the AF controller 712 generates a driving signal related to the movement of the lens (lens frames) in accordance with the instruction signals by referring to the lens driving information 713c and outputs it to the camera head controller 94.

The fifth embodiment may move the lenses (lens frames) with higher accuracy and adjust the focal point position by moving the lenses (lens frames) with higher degree of freedom as in the above-mentioned third and fourth embodiments.

Furthermore, in the fifth embodiment, the transmission of the imaging signal may be transmission of the optical signal as in the above-mentioned second embodiment.

Sixth Embodiment

Figure 10:
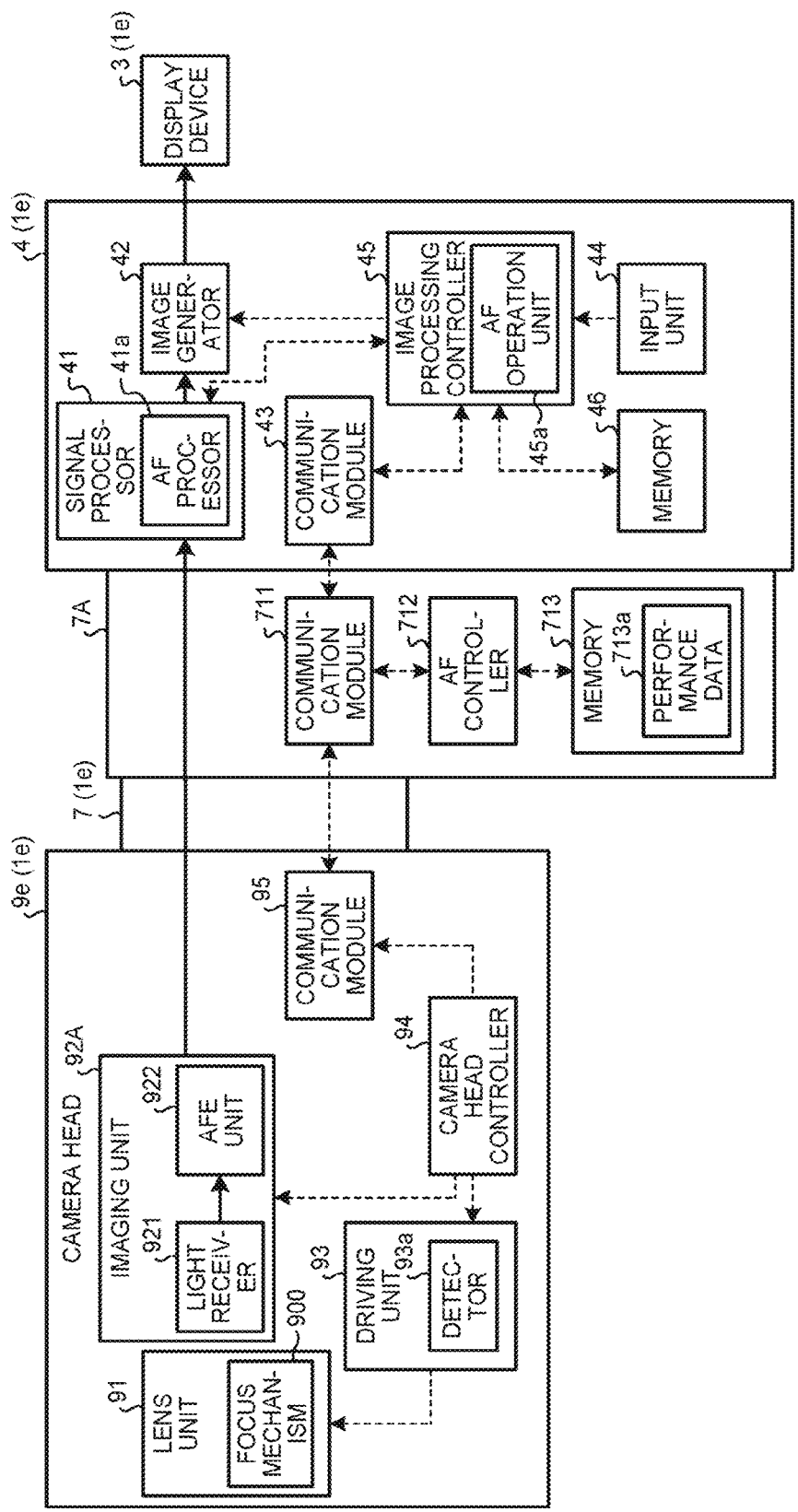
FIG. 10 is a block diagram illustrating the configurations of a camera head and an image processing device according to a sixth embodiment of the disclosure.

Next, a sixth embodiment of the disclosure will be described. FIG. 10 is a block diagram illustrating the configurations of a camera head and an image processing device in the sixth embodiment. The same reference numerals and symbols denote the same configurations as the above-mentioned configurations. In the sixth embodiment, the camera head adjusts gain of the imaging signal.

An endoscope device 1e in the sixth embodiment includes the endoscope 8, the imaging device 2, the display device 3, and the image processing device 4 as described above. In the sixth embodiment, the imaging device 2 includes a camera head 9e instead of the camera head 9. The camera head 9e includes an imaging unit 92A instead of the above-mentioned imaging unit 92 of the camera head 9, as illustrated in FIG. 10.

The imaging unit 92A includes a light receiver 921 receiving light of an imaging target through the lens unit 91 and an analog front end unit (AFE unit) 922 performing gain adjustment processing and A/D conversion processing on the imaging signal as the electric signal input from the light receiver 921. The light receiver 921 corresponds to photodiodes of a CCD or a CMOS. The AFE unit 922 performs the gain adjustment processing of amplifying the gain of the imaging signal by a predetermined amplification amount before the A/D conversion under control by the camera head controller 94. It should be noted that the light receiver 921 and the AFE unit 922 may be formed separately or integrally. For example, the AFE unit 922 may be provided integrally on one CMOS imaging element provided with the light receiver 921.

The gain adjustment is described. When the signal processor 41 receives the imaging signal from the imaging unit 92A, it performs detection processing of the imaging signal and outputs the detection result to the image processing controller 45. The image processing controller 45 sets an amplification amount by which the AFE unit 922 performs the amplification based on the detection result and outputs it as a control signal to the AF controller 712. The AF controller 712 sets a gain adjustment amount based on the control signal and outputs it as a driving signal to the camera head controller 94. The camera head controller 94 causes the AFE unit 922 to amplify the gain of the imaging signal in accordance with the gain adjustment amount as indicated by the received driving signal.

The sixth embodiment may provide the effects provided in the above-mentioned first embodiment. In addition, the imaging signal detection processing is performed and the gain adjustment in accordance with the detection processing is performed on the imaging signal output from the camera head 9e before the A/D conversion. Noise in the imaging signal that is transmitted may be therefore reduced by performing the amplification processing in a state of the analog signal.

Although the embodiments of the disclosure have been described hereinbefore, the disclosure should not be limited by the above-mentioned embodiments. Although the AF controller 712 generates the driving signal and so on in the above-mentioned embodiments, the camera head controller 94 may generate the driving signal.

Although the AF controller 712 and the memory 713 are provided in the first connector unit in the above-mentioned embodiments, the memory 713 may be provided in the camera head or the camera head controller 94 may generate the driving signal by referring to the memory 713 provided in the camera head.

Although the communication modules 43, 95, and 711 as the relay devices for signal transmission are provided in order to make communication among the camera head 9, the transmission cable 7, and the image processing device 4 in the above-mentioned embodiments, the configuration is not limited thereto and at least any of the relay devices may not be provided and direct communication may be made.

Although the medical image acquisition system is used for the endoscope system as an example in the above-mentioned embodiments, it is not limited to the endoscope system as long as it is a medical image acquisition system imaging an observation site. For example, the medical image acquisition system may be applied to a medical microscope system. The medical microscope system is a medical image acquisition system observing a predetermined site of a subject while enlarging it. The medical microscope system includes a camera head enlarging and imaging the subject and a transmission cable transmitting an imaging signal from the camera head. Furthermore, the medical microscope system includes a movable arm portion to which the camera head is connected detachably and that holds the camera head and an image processing device to which the transmission cable of a signal transmitter is connected. The medical microscope system may move and fix a relative position and a posture of the camera head relative to the subject by gripping a camera head portion and moving the camera head while deforming the arm. In the case of the medical microscope system, the transmission cable and the image processing device may be connected detachably or fixed and connected integrally. The medical image acquisition system according to the disclosure is useful for the above-mentioned medical microscope system, for example.

As described above, the medical image acquisition system and a medical imaging device of the disclosure are useful for reducing burden on the user regardless of the characteristics of the camera head.

It should be understood by those skilled in the art that various modifications, combinations, sub-combinations and alterations may occur depending on design requirements and other factors insofar as they are within the scope of the appended claims or the equivalents thereof.

What is claimed is:

1. A cable unit for an imaging system, the cable unit comprising:
    a first connection configured to be connected with an image processing device of the imaging system detachably,
    a second connection configured to be connected with a camera head of the imaging system, and
    a transmission cable that connects the first connection and the second connection, wherein
    the first connection includes
        a memory that stores autofocus performance information regarding autofocus performance of the camera head, and
        autofocus control circuitry configured to control an optical unit of the camera head, based on the autofocus performance information stored in the memory to control a focus state of an image captured by the camera head to be in an in-focus state.

2. The cable unit according to claim 1, wherein
    the autofocus control circuitry is configured to control the optical unit of the camera head based on the autofocus performance information stored in the memory and an evaluation result of the focus state of the image.

3. The cable unit according to claim 2, wherein the autofocus control circuitry is configured to receive the evaluation result of the focus state of the image received from the image processing device.

4. The cable unit according to claim 1, wherein the autofocus control circuitry is configured to control the optical unit of the camera by outputting a control signal to the camera head.

5. The cable unit according to claim 1, wherein the camera head includes:
   an image sensor,
   the optical unit, including at least an optical lens, configured to form an optical image on the image sensor, and
   a focus mechanism configured to move the optical lens, and the focus mechanism is driven by the control signal received from the cable unit.

6. The cable unit according to claim 1, wherein the memory stores a plurality of pieces of data for autofocus performance information regarding a plurality of autofocus performances of a plurality of camera heads.

7. The cable unit according to claim 1, wherein the autofocus performance information includes information of a movement distance of a lens of the camera head between frames for which imaging is made in the autofocus performance of the camera head.

8. The cable unit according to claim 1, wherein the autofocus performance information includes setting information of a driver for driving the optical unit of the camera head.

9. The cable unit according to claim 1, wherein the autofocus performance information includes information of a lens movement amount for an input signal to a focus mechanism of the camera head.

10. The cable unit according to claim 1, wherein the autofocus performance information includes individual variation data of the optical unit of the camera head, or variation data of a driver for driving the optical unit.

11. The cable unit according to claim 1, wherein the imaging system is an endoscopic imaging system.

* * * * *